United States Patent Office 3,532,421
Patented Oct. 6, 1970

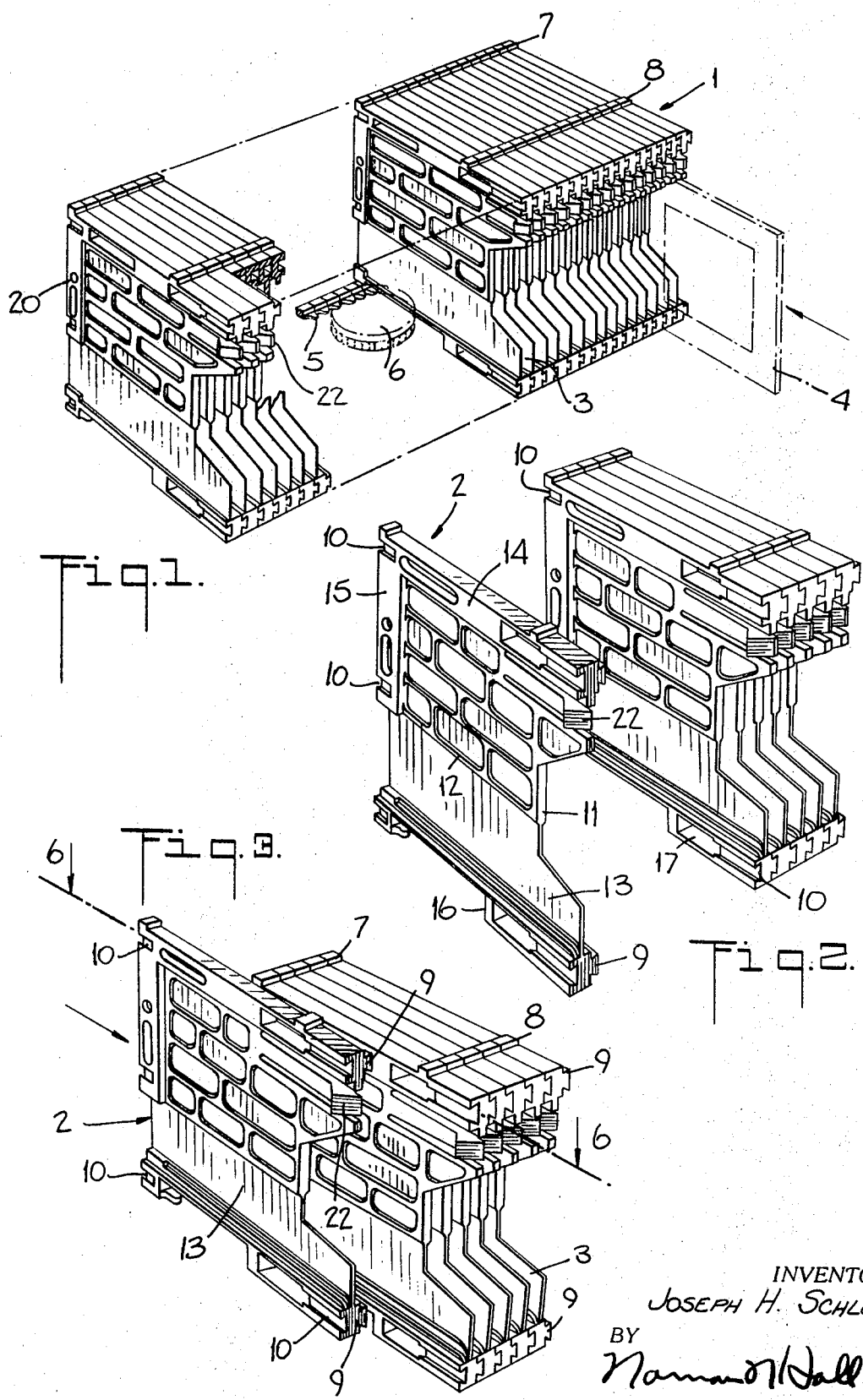

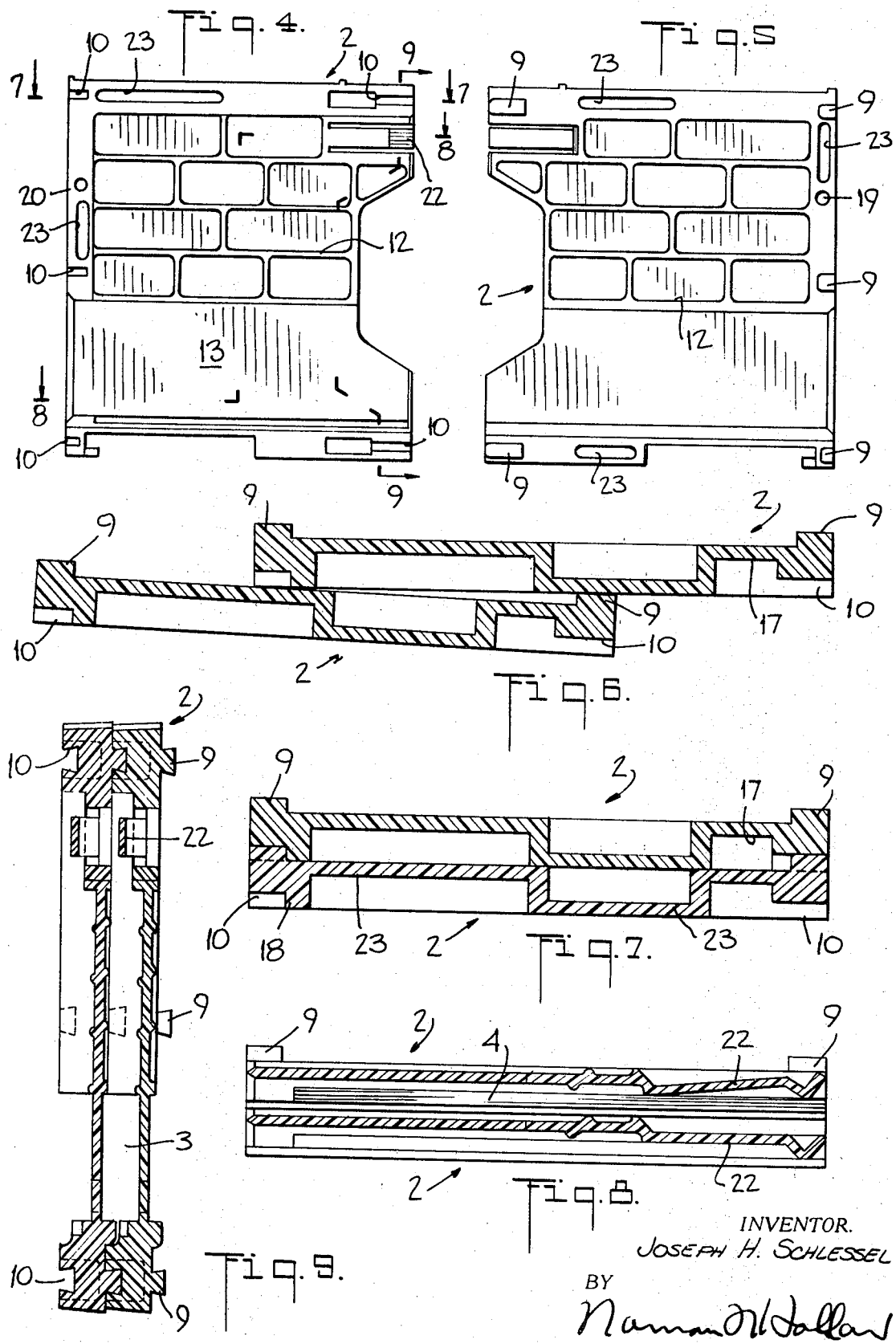

3,532,421
MODULAR SLIDE TRAY
Joseph H. Schlessel, Great Neck, N.Y., assignor to Airequipt Inc., New Rochelle, N.Y., a corporation of New York
Filed Dec. 15, 1967, Ser. No. 690,960
Int. Cl. G03b 21/00
U.S. Cl. 353—122                                   4 Claims

ABSTRACT OF THE DISCLOSURE

A magazine or tray of the type used to store and to automatically exhibit photographic slides and which is formed from individual detachable modules. One module is provided for each slide and a completed magazine is formed by snapping or otherwise attaching the individual modules together to form a single slide holding tray having the desired number of slide receiving compartments as well as a guide rail or other member for facilitating the advance of the magazine through the projector and also including a rack or other means for periodically advancing the magazine. The individual modules also preferably include an integrally formed slide retaining spring to releasably retain the individual slides in the slide compartments.

BACKGROUND OF THE INVENTION

An almost universally used system of photography makes use of slides or transparencies which are exhibited by being projected or viewed by automatic slide projectors. The storage and presentation of these slides to the projectors is usually done by arranging the slides in compartmented slide magazines or trays. While the use of such trays is advantageous both for storing and exhibiting slides, presently used trays have standard dimensions and are formed with a specific number of slide compartments. Where it is desired to group a number of slides that are directed to a particular subject and where this group is either larger or smaller than the capacity of one magazine, it is common practice to include slides from one or more groups in a single magazine. This causes considerable inconvenience and some confusion where it is desired to exhibit only the slides of a particular group and also makes magazine identification and storage of the slides difficult due to the presence of slides on differing subjects.

The present invention provides a means of forming a magazine of the exact size necessary for a particular group of slides to be stored, exhibited, and conveniently identified by the subject matter contained. It also provides a magazine which may be lengthened or shortened from time to time as convenient in revising or regrouping particular arrangements of slides.

SUMMARY OF THE INVENTION

The invention comprises individual modules or blocks each one of which preferably provides one compartment for the storage of a slide. The individual modules include integral attachment means whereby they are fitted together in the necessary numbers to build magazines of the appropriate sizes. The modules preferably are molded as an unitary member from plastic with all of the necessary elements formed simultaneously in the molding operation, however, the modules alternatively may be molded of other materials or may be otherwise shaped to form a module or block as described below.

The individual modules, for example, include integral attaching means such as tongue and groove elements as well as portions of the magazine advancing rack for cooperation with a projector pinion plus suitable magazine guide rails and labeling surfaces or areas. In addition, the individual modules each preferably include an integrally formed spring means for releasably holding the slides in the magazine compartments.

Accordingly, an object of the present invention is to provide a slide holding magazine or tray of variable capacity.

Another object of the present invention is to provide a slide tray of variable size or capacity formed of individual unitary modules.

Another object of the present invention is to provide an improved modular slide magazine or tray.

Another object of the present invention is to provide a modular, variable size, slide tray including integral slide retention members.

Another object of the present invention is to provide easily manufactured modular slide retaining members adapted for being combined to form unitary slide trays of varying capacity.

Other and further objects of the invention will be obvious upon an understanding of the illustrative embodiment about to be described or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification wherein:

FIG. 1 is a perspective view partially cut away of a preferred embodiment of the modules assembled to form a multi-compartment magazine;

FIGS. 2 and 3 are perspective views illustrating the assembly of several modules;

FIGS. 4 and 5 are enlarged side elevational views of opposite sides of a preferred embodiment of the module;

FIG. 6 is a sectional view of the modules taken along line 6—6 on FIG. 3; and

FIG. 7, 8, and 9 are sectional views of the modules taken along lines 7—7, 8—8, and 9—9 on FIG. 4.

FIG. 1 illustrates an assembled magazine 1 formed of a connected group of modules 2. The magazine 1 is seen to provide a number of compartments 3 for receiving slides such as the slide 4. The assembled modules 2 are also seen to cooperate to form a magazine indexing rack 5 for cooperation with a magazine advancing pinion 6 as provided on conventional projectors. The connected modules 2 also provide suitable guide rails as required for particular projectors of the general form as illustrated at 7 and 8 in FIG. 1.

The enlarged views in FIGS. 2 and 3 more clearly illustrate the attached relationship of the individual modules 2. FIG. 2 illustrates five modules coupled together for providing four slide receiving compartments 3 and illustrates an additional module 2 being moved into position to form a fifth compartment.

FIG. 3 shows this additional module being pressed against one side of the assembled stack of modules with the preferred tongue 9 and groove 10 coupling elements being moved toward one another.

The details of a preferred embodiment of the modules 2 are best illustrated in detailed FIGS. 4–9. The modules 2 are seen to comprise a partition 11 which forms one side of a slide compartment. The preferred partitions 11 are relatively thin to reduce the weight and material and preferably have upstanding reinforcing ridges 12. The lower portion of the partition is of reduced thickness and forms a slide changing lever passage 13 which permits the projector lever to move through the magazine 1 to move slides 4 to and from the viewing position. The partitions 11 have flanges at their edges to form a frame for the slide receiving compartment including a top flange 14, a front flange 15, and a bottom flange 16. Various means of interlocking may be provided to detachably connect the modules 2 together. A preferred embodiment, as illustrated, comprises beveled tongues 9 and grooves 10 which preferably are provided at the front and rear of the top and bottom flanges 14 and 16. An additional tongue 9 may also be provided, as illustrated near the passage 13 on the front flange 15.

In the preferred method of assembly, the module 2 being attached is moved in the direction indicated in FIG. 6. A lead groove 17 is preferably provided to facilitate the entry of the tongues 9 on the top and bottom flanges 14 and 16 into their corresponding grooves 10. The assembly of the modules into the proper position is facilitated by a stop member 18 positioned at the end of the front groves 10 in the top and bottom flanges 14 and 16. This stop 18 correctly positions the assembled modules 2 and it also acts to prevent accidental disassembly of the magazine 1 as a slide changing lever is moved into the slide lever passage 13 of the assembled magazine 1.

Each of the modules 2 also preferably includes a raised positioning detent 19 on one side and a cooperating slot or aperture 20 on the other side so that the facing detent 19 and slot 20 on adjacent modules will snap together during assembly to releasably hold the modules in their correct position as well as to resist unintentional detachment of the modules 2 of a complete magazine 1. The magazine indexing rack 5 is provided by including a portion 21 of the slide indexing rack at a convenient position on each module as illustrated in FIGS. 2 and 4. Since most projector slide advancing pinions advance one tooth to advance a magazine one compartment, a suitable magazine rack is provided which has one tooth on each module 2.

Each of the preferred modules 2 also includes an integral slide retention spring for releasably retaining slides 4 in assembled magazines. Such a spring may conveniently be formed as an integral portion of the partition in the form of the spring finger 22 best illustrated in FIGS. 2, 8, and 9. FIG. 8, for example, shows assembled modules 2 with a slide 4 inserted in the upper compartment 3, which is held in place by the yieldable spring finger 22.

To save material and to lighten the modules, suitably positioned recesses 23 are provided in the modules as illustrated in FIGS. 4 and 5.

It will be seen that an improved means is provided for forming slide storing and exhibiting magazines of varying capacities. The individual modules are so shaped that all of the essential features of a magazine are provided in an assembled group of identical individual modules. The individual modules are assembled to form a magazine including slide compartments, slide retention springs, magazine guide rails, and an indexing rack. These features are provided in a module which may be conveniently molded of plastic or otherwise formed as a unitary member of other material. Magazines formed in this manner are readily adapted for storing various types of paper mounts, metal mounts, or glass mounts, or combined mounts and the magazine is also readily adapted for storing and exhibiting slides of differing sizes.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described by invention, I claim:

1. A slide holding member comprising the combination of a single relatively thin partition having relatively thicker flanges at the edges thereof forming a slide retaining recess, tongue means on one side of said flanges and cooperating groove means on the other side of said flanges for detachably connecting said slide holding member to similar members on opposite sides of said partition for forming a slide holding magazine for a plurality of slides, resilient slide retention means positioned on said member for removably engaging a slide positioned thereon, and a portion of a slide magazine advancing rack on said flanges for combining with similar portions on said similar members to form a magazine advancing rack.

2. A slide magazine comprising the combination of a plurality of slide holding members, each member having a single relatively thin partition with relatively thicker flanges at the edges thereof forming a slide retaining recess, tongue means on one side of said flanges and cooperating groove means on the other side of said flanges for detachably connecting each side holding member to similar members on opposite sides of said partition, resilient slide retaining members on said slide holding members for removably engaging slides positioned thereon, and a portion of a slide magazine advancing rack on said flanges of each member for combining with similar portions on the other members forming a magazine advancing rack.

3. A slide holding member comprising the combination of a single relatively thin partition having relatively thicker flanges at the edges thereof forming a slide retaining recess adjacent the plane of said partition, one of said flanges having a passage formed therein, tongue means on one side of said flanges and cooperating groove means on the other side of said flanges for detachably connecting said slide holding member to similar members on opposite sides of said partition for forming a slide holding magazine for a plurality of slides, and a portion of a slide magazine advancing rack on said flanges for combining with similar portions on said similar members to form a magazine advancing rack.

4. A slide magazine comprising the combination of a plurality of slide holding members, each member having a single relatively thin partition with relatively thicker flanges at the edges thereof forming a slide retaining recess adjacent the plane of said partition, one of said flanges having a passage therein, tongue means on one side of said flanges and cooperating groove means on the other side of said flanges detachably connecting each slide holding member to similar members on opposite sides of said partition, and a portion of a slide magazine advancing rack on said flanges of each member for combining with similar portions on the other members forming a magazine advancing rack.

References Cited

UNITED STATES PATENTS

| 3,413,062 | 11/1968 | Zillmer | 40—79 |
| 3,419,987 | 1/1969 | Hipp | 40—152 |

FOREIGN PATENTS

| 1,347,792 | 11/1963 | France. | |

HARRY N. HAROIAN, Primary Examiner

U.S. Cl. X.R.

40—64; 353—116; 206—73